United States Patent Office 3,637,622
Patented Jan. 25, 1972

3,637,622
PROCESS FOR THE POLYMERIZATION OF VINYL CHLORIDE
Sergio Lo Monaco, Milan, Corrado Mazzolini, Mestre, and Luigi Patron and Alberto Moretti, Venice, Italy, assignors to Chatillon Società Anonima Italiana per le Fibre Tessili Artificiali S.p.A., Milan, Italy
No Drawing. Continuation-in-part of application Ser. No. 784,191, Dec. 16, 1968. This application July 22, 1970, Ser. No. 57,305
Claims priority, application Italy, July 31, 1969, 20,357/69
Int. Cl. C08f *1/04, 1/61, 3/30*
U.S. Cl. 260—85.5    5 Claims

ABSTRACT OF THE DISCLOSURE

A process is disclosed for the low temperature bulk polymerization of vinyl chloride by using, as catalyst, a catalytic system consisting essentially of an organic hydroperoxide and an ammonium salt of the general formula:

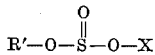

wherein

R' is an alkyl, cyclo-alkyl, aryl or aryl-alkyl radical having from 1 to 12 carbon atoms, and X is a radical containing quaternary nitrogen Preferably R' is an alkyl radical having from 1 to 4 carbon atoms, and X is $NH_4$ or $NR_4''$, R'' being an alkyl radical having from 1 to 4 carbon atoms.

---

The present invention relates to a process for the low temperature bulk polymerization of vinyl chloride and it constitutes an improvement over a process disclosed in an earlier Lo Monaco et al., U.S. patent application Ser. No. 784,191, filed Dec. 16, 1968, of which the present application is a continuation-in-part.

In that earlier application a process is described for the low temperature bulk polymerization of vinyl chloride by using a catalytic system consisting of an organic hydroperoxide and a salt of a mono-ester of sulphurous acid of the following general formula:

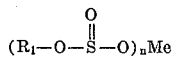

wherein $R_1$ represents an alkyl, cyclo-alkyl or aryl radical having from 1 to 12 carbon atoms;

Me represents a metal of the 1st or 2nd group of the Periodic System or aluminum, and n is 1, 2 or 3 depending on the valency of Me.

As described in that earlier application, the term "organic hydroperoxide" means an organic compound of the general formula:

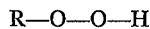

wherein

R may be a linear or branched alkyl radical, a cyclo-alkyl, an aryl or an aryl-alkyl radical. Examples of orgnic compounds having this general formula are: methyl-, ethyl-, n-propyl-, tert.-butyl-, n-butyl-, amyl-, hexyl-, octyl-, etc. hydroperoxides, phenyl-ethyl hydroperoxide, phenyl-iso-butyl-hydroperoxide, phenyl - isopropyl-hydroperoxide, etc.

Of these, cumenehydroperoxide and tert.butyl-hydroperoxide are preferred.

The concentration of the organic hydroperoxide is not particularly critical and in general can vary from 0.01% to 3% by weight with respect to the monomers. Organic hydroperoxide concentrations between 0.02% and 0.2% are preferred.

As further specified in that earlier application, the concentration of the salt of the mono-ester of the sulphurous acid will in general vary from 0.01% to 2% by weight with respect to the monomer. Concentrations between 0.035% and 0.5% are in practice preferred; however, concentrations greater than 2% can also be used but in general are not advisable because they do not bring about any appreciable increase in the polymerization rate but only a greater consumption of this component of the catalyst system.

The salts of the mono-esters of sulphurous acid may be added to the reaction mixture either as such or, better still, dissolved in an inert organic solvent. Suitable solvents are the saturated aliphatic alcohols having from 1 to 5 carbon atoms, and amongst these methyl alcohol and ethyl alcohol are preferred.

It has now been discovered in accordance with the present invention that the low temperature bulk polymerization of vinyl chloride is efficiently started also when, as a catalyst, a catalytic system is used which consists of an organic hydroperoxide and an ammonium salt of a mono-ester of sulphurous acid having the following general formula:

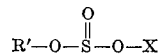

wherein

R' is an alkyl, a cyclo-alkyl, an aryl or aryl-alkyl radical having from 1 to 12 carbon atoms, and X is a radical containing quaternary nitrogen.

It must be expressly pointed out that, as distinguished from the organic hydroperoxides, the organic peroxides of the general formula R—O—O—R, in co-operation with an ammonium salt of a mono-ester of sulphurous acid of the general formula specified above, are ineffective in starting the low temperature bulk polymerization of vinyl chloride.

Amongst the suitable quaternary nitrogen-containing radicals may be listed: the radicals obtained by quaternization of ammonia, of primary- secondary- or tertiary-aliphatic, alicyclic or aromatic amines, such as for instance: ammonium, mono-ethyl-ammonium, dimethyl-ammonium, tri-methyl-ammonium, di-ethyl-ammonium, cyclohexyl-ammonium, etc., as well as tetra-methyl-ammonium, tetra-ethyl-ammonium, etc.; as well as the radicals obtained from the quaternization of the basic heterocyclic compounds of nitrogen.

Specific examples of suitable ammonium salts of a mono-ester of sulphurous acid having the general formula specified above are: ammonium methyl-sulphite, tetra-methyl-ammonium methyl-sulphite, tri-methyl-ammonium methyl-sulphite, di-methyl-ammonium methyl sulphite, mono-methyl-ammonium methyl sulphite, tetra-methyl-ammonium, ethyl-sulphite, tetra-ethyl-ammonium ethyl-sulphite, and the like, tetra-ethyl-ammonium n-propyl-sulphite, tri-propyl-ammonium tert. butyl-sulphite, di-propyl-ammonium n-amyl-sulphite, ammonium cyclo-hexyl-sulphite, cyclo-hexyl-ammonium-benzyl-sulphite, mono-benzyl-ammonium phenyl-ethyl-sulphite, etc.

Among these sulphur compounds, those in which

R' is an alkyl radical having from 1 to 4 carbon atoms, and

X is $NH_4$ or $NR_4''$, R'' being an alkyl radical having from 1 to 4 carbon atoms, have proved to be particularly effective.

These ammonium salts of a mono-ester of sulphurous acid may be prepared, for instance, by adding to an alcoholic solution of sulphur dioxide a basic compound of nitrogen.

The formation of the ammonium salt of the mono-ester of sulphurous acid, as can be followed via the potentiometric titration, is obtained when the molar ratio, basic nitrogen compound/$SO_2$, is 1. Upon adding an excess of basic nitrogen compound up to a molar ratio of 5 with respect to the $SO_2$, no formation of other products can be observed.

The ammonium salt of the mono-ester of sulphurous acid may be separated by crystallization from the alcoholic solution, or, better still, it may be directly fed into the polymerization medium by using the reaction medium itself in which it has been prepared. In this latter case there may be used alcoholic solutions containing also an excess of basic nitrogen compound since it has been found that the eventual free base does not influence the polymerization rate, while it hinders the formation in the polymer of sulphone groups

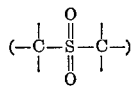

due to the copolymerization of the unreacted $SO_2$ (corresponding to a ratio: basic nitrogen compound/$SO_2$ of less than 1) with the vinyl chloride, such sulphone groups if present would prejudice the thermal stability of the polymer.

By the term "low temperature" herein is understood any temperature below 0° C. and in particular temperatures between −10° C. and −70° C. This temperature of the reaction mixture is controlled by conventional means, for instance, by immersing the reactor in a cryostatic bath, or by circulating a cooling liquid around the walls of the reactor or through cooling coils disposed within the reactor.

By "bulk polymerization" is meant not only polymerization carried out by the catalytic system in the undiluted monomer, but also when effecting the polymerization in the presence of minor quantities of non-reacting organic compounds, liquid at the polymerization temperature, and which exert a fluidizing action on the polymerization mixture in order to render this latter more easily stirrable and for facilitating thermal exchange through the polymerization vessel. As suitable fluidizing agents the following substances may be mentioned by way of example: aliphatic hydrocarbons, aryl hydrocarbons, cycloalkyl hydrocarbons, saturated halogenated hydrocarbons, etc.

To the polymerization mixture may if desired be fed small quantities (for instance from 50 to 1000 p.p.m.) of an alkyl mercaptan in order to regulate the molecular weight of the polymer. It has been observed that the alkyl-mercaptanes, besides acting as chain regulators, act also as fluidizers of the polymerization mixture. Among the alkyl-mercaptans, those having from 1 to 15 carbon atoms are preferred and those having at most 4 carbon atoms give the best results.

It is advisable to carry out the polymerization in the absence of oxygen which has an inhibiting effect on the polymerization. In general, for this purpose any suitable inert gas, such as for instance nitrogen, may be used for expelling the air from the polymerization reactor.

The polymerization may be short-stopped at any desired stage, that is, at the desired monomer conversion and at the desired molecular weight, by treating the reaction mixture with an aqueous or alcoholic solution of a hydroxylamine salt, preferably hydroxylamine hydrochloride or sulphate. In the case of a continuous polymerization system, the hydroxylamine salt solution may be added either in the overflow pipe at the outlet of the reactor or in a subsequent tank containing water heated up to 50° C., in which is contemporaneously carried out the short-stopping of the polymerization and the separation, by evaporation, of the unreacted monomer from the polymer.

It is to be understood that the catalytic system used in the process of the present invention may also be employed advantageously in the preparation of copolymers of vinyl chloride containing up to 50% by weight of at least one other ethylenically unsaturated monomer copolymerizable with vinyl chloride. In such case, the only difference with respect to the herein described process is that the starting monomers are a mixture of vinyl chloride with one or more of the said other ethylenically unsaturated copolymerizable monomers. By the term "ethylenically unsaturated monomers" is to be understood those organic compounds containing the $>C=C<$ group. Examples of such compounds are vinyl and vinylidene compounds such as: vinylidene fluoride or chloride, vinyl fluoride, vinyl esters of aliphatic carboxylic acids containing from 2 to 18 carbon atoms such as for instance: vinyl esters of acetic acid, of propionic acid, etc., monomers of the acrylic type such as acrylic acid, methacrylic acid and their derivatives such as acrylonitrile, acrylates and methacrylates of aliphatic alcohols containing from 1 to 12 carbon atoms, etc.

In order still better to illustrate the inventive idea of the present invention as well as for putting into practice the same, the following non-limiting examples are given:

EXAMPLE I

Into a 2 liter polymerization reactor containing 2000 g. of vinyl chloride pre-cooled to −30° C. and maintained at this temperature by means of a thermostatic bath, over a period of two hours were fed the following substances:

|  | G. |
|---|---|
| Cumene-hydroperoxide | 3 |
| Ammonium mono-methyl-sulphite | 2.3 |

After completion of the feeding, the reactor was maintained at −30° C., under constant stirring, in a nitrogen atmosphere for one hour. Thereupon the reaction mixture was discharged and the polymer was recovered by filtration.

The polymer thus obtained was washed with methanol and then dried in an oven at 50° C. under vacuum for 12 hours.

240 g. of polymer (conversion=12%) were obtained which showed the following characteristics:

| Intrinsic viscosity | dl./g | 1.30 |
|---|---|---|
| Original color: | | |
| PI | | 98.7 |
| B | | 93.5 |

The intrinsic viscosity was determined in cyclohexanone at 30° C.

The original color of the polymer was determined by the General Electric integrating spectrophotometer, according to the C.I.E. system of representation and measuring of color. According to this system the color is expressed in terms of a "purity index" (PI) and the brightness (B) referred to the Standard Illumination.

EXAMPLE II

By operating according to the procedure of Example I, in two hours into the two liter polymerization reactor, pre-loaded with 2000 g. of liquid vinyl chloride pre-cooled to −30° C., were fed:

| Tert. butyl-hydroperoxide | g. | 1.8 |
|---|---|---|
| A 10% ethanolic solution of tetra-methyl-ammonium mono-ethyl-sulphite | cc. | 3.5 |

This ethanolic solution of tetra-methyl-ammonium mono-ethyl-sulphite is prepared by reacting 3.78 g. of $SO_2$ with 5.4 g. of tetra-methyl-ammonium hydroxide in 100 cc. of ethyl alcohol.

The polymerization conversion amounted to 12.5% and the polymer obtained showed the following characteristics:

Intrinsic viscosity _____ dl./g__ 1.38
Original color:
  PI _____ 98.9
  B _____ 94.2

The same results will be obtained if the ethanolic solution is prepared by reacting 3.78 g. of SO₂ and 8.1 g. of tetra-methyl-ammonium hydroxide in 100 cc. of ethyl alcohol.

EXAMPLE III

By operating according to the procedure of Example I, in two hours were fed into the reactor:

|  | G. |
|---|---|
| Cumene hydroperoxide | 5.0 |
| Dimethyl-ammonium tert.butyl sulphite | 12.8 |

The polymerization conversion amounted to 12.8% and the polymer obtained showed the following characteristics:

Intrinsic viscosity _____ dl./g__ 1
Original color:
  PI _____ 99.0
  B _____ 93.2

EXAMPLE IV

By operating according to Example I, in two hours were fed:

|  | G. |
|---|---|
| Cumene hydroperoxide | 3.0 |
| Mono-methyl-ammonium ethyl-sulphite | 2.8 |

The polymerization conversion amounted to 9.2% and the polymer obtained showed the following characteristics:

Intrinsic viscosity _____ dl./g__ 1.01
Original color:
  PI _____ 99.8
  B _____ 94.2

EXAMPLE V

Into a 2 liter polymerization reactor fitted with a stirrer and provided with a cooling system and a thermometer, were continuously fed in:

|  | G./hr. |
|---|---|
| Liquid vinyl chloride, pre-cooled to −40° C. | 500 |
| Cumene hydroperoxide | 0.5 |
| Ammonium mono-methyl-sulphite in solution in methyl alcohol (10%) | 3.8 |
| 2-mercapto-ethanol | 0.025 |

The polymerization reactor was maintained at a temperature of −40° C. by means of a thermostatic bath.

Through the overflow pipe the suspension of the polymer thus obtained was discharged into an aqueous solution of hydroxylamine hydrochloride maintained at pH 6 by the addition of sodium bicarbonate. The polymer was then separated by centrifugation and was then washed with methanol and with ethyl ether. Finally it was dried.

The polymerization conversion amounted to 11% and the polymer thus obtained showed an intrinsic viscosity of 1.29 dl./g.

What is claimed is:

1. In a process for the low temperature bulk polymerization of vinyl chloride at a temperature below 0° C. by using, as catalyst, a catalytic system consisting essentially of an organic hydroperoxide in a concentration between 0.01% and 3% by weight with respect to the monomers and a salt of the monoester of sulphurous acid in a concentration between 0.01% and 2% by weight with respect to the monomers, the improvement wherein as said salt is used an ammonium salt of the general formula:

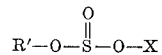

wherein

R' is an alkyl, cyclo-alkyl, aryl or aryl-alkyl radical having from 1 to 12 carbon atoms, and X is a radical containing quaternary nitrogen.

2. A process according to claim 1, wherein

R' is an alkyl radical having from 1 to 4 carbon atoms and

X is NH₄ or NR₄'', R'' being an alkyl radical having from 1 to 4 carbon atoms.

3. A process according to claim 1, wherein the said ammonium salt is directly introduced into the polymerization mixture by using the same reaction medium in which it has been prepared.

4. A process according to claim 3, wherein the said same reaction medium is an alcoholic solution of SO₂ and of the gasic nitrogen compound employed for making the said ammonium salt.

5. A process according to claim 4, wherein the molar ratio, basic nitrogen compound/SO₂, is greater than 1 and up to 5.

References Cited

UNITED STATES PATENTS 3,520,867   7/1970   Lo Monaco _____ 260—87.5

JOSEPH L. SCHOFER, Primary Examiner

J. A. DONAHUE, JR., Assistant Examiner

U.S. Cl. X.R.

260—86.3, 87.1, 87.5 A, 87.7, 92.8

UNITED STATES PATENT OFFICE
CERTIFICATE OF CORRECTION

Patent No. 3,637,622　　　　　　　　Dated January 25, 1972

Inventor(s) SERGIO LO MONACO et al

It is certified that error appears in the above-identified patent and that said Letters Patent are hereby corrected as shown below:

The priority claim in the heading should read:

--Claims priority, applications Italy,

December 19, 1967, No. 24,081 A/67

July 31, 1969, No. 20,357 A/69--

Signed and sealed this 10th day of July 1973.

(SEAL)
Attest:

EDWARD M.FLETCHER,JR.　　　　　Rene Tegtmeyer
Attesting Officer　　　　　　　Acting Commissioner of Patents